3,182,077
DEHYDRATION OF HYDROXY ESTERS
James L. Dever, Ambler, Pa., assignor to Monsanto Research Corporation, St. Louis, Mo., a corporation of Delaware
No Drawing. Filed Aug. 7, 1962, Ser. No. 215,304
5 Claims. (Cl. 260—486)

This invention relates to a method of chemical synthesis, and more particularly, provides a novel method for conversion of β-hydroxy alkanoic acids to α,β-unsaturated acids.

Unsaturated carboxylic acids, as such or in the form of derivatives such as the salts and esters, are valuable materials which are consumed in large quantities by industry. The α,β-unsaturated acids, wherein the carbonyl and the olefinic unsaturation are conjugated

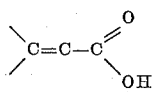

are particularly valuable: the conjugation tends to promote reactivity.

Vinyl carboxyl compounds such as acrylic and methacrylic acids and their derivatives are readily prepared commercially, by a variety of processes. However, when it comes to producing longer chain unsaturated acids, complications arise. In the dehydration of a β-hydroxyalkanoic acid, where the hydroxy-substituted C atom is a terminal carbon atom, the hydrogen atom which combines with the hydroxyl group in the dehydration necessarily comes from the α-carbon atom. But if this carbon atom is internal, the hydrogen atom can come either from the α-carbon atom or from the γ-carbon atom.

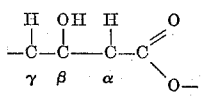

Particularly when the α-carbon atom is alkyl-substituted, it has been found that although appropriate dehydrating agents can favor either of α,β- and β,γ-unsaturation, the production of one or the other is never exclusive. A mixture of the two olefinic products, the α,β-unsaturated and the β,γ-unsaturated alkenoic acids, is obtained. Such a mixture is generally impossible to separate by procedures such as distillation. The dehydration of an α-alkyl-β-hydroxyalkanoic acid having four or more carbon atoms in the hydroxy-substituted alkanoic acid chain has thus not proved to be a satisfactory method of synthesis for α-alkyl crotonic and higher α,β-alkenoic acids. Consequently, although the α-alkyl β-hydroxy butanoic and higher acids are quite readily available, their dehydration has not been adopted for the synthesis of pure olefinic acids, since contamination of the α,β-unsaturated acid product by the β,γ-unsaturated acid product could not be avoided.

It is an object of this invention to provide a novel method for the dehydration of a β-hydroxy alkanoic acid compound.

A particular object of this invention is to provide a novel process whereby an α-alkyl-β-hydroxyalkanoic acid compound in which the hydroxy-substituted alkanoic acid chain contains at least four carbon atoms is converted to the corresponding α-alkyl-α,β-unsaturated alkenoic acid compound, substantially free of β,γ-unsaturated product.

These and other objects will become evident on a consideration of the following specification and claims.

It has now been found that α-alkyl-β-hydroxyalkanoic acid esters of the formula

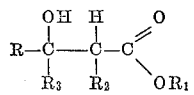

where R is selected from hydrogen and alkyl radicals and $R_1$, $R_2$ and $R_3$ are each alkyl radicals, can be converted to substantially pure α,β-unsaturated acid esters of the formula:

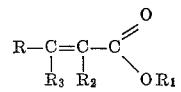

where R, $R_1$, $R_2$ and $R_3$ are as defined above, by reacting a β-hydroxy ester of the stated formula with phosphorus oxychloride in a reaction medium comprising a tertiary amine, and thereafter contacting the resulting ester product with a strong inorganic base in an organic reaction medium.

The presently provided procedure results in a product of surprising uniformity and purity. The product of direct distillation of the reaction product has been found to be 98 area-percent pure α,β-unsaturated ester, under conditions producing a 76% yield based on starting β-hydroxy alkanoate ester. By comparison with previously known methods favoring α,β compared to β,γ unsaturation, but not excluding the latter, the distribution with the same starting material would be at best about 75% α,β and 25% β,γ.

The present method not only avoids contamination of the wanted α,β by the unwanted β,γ-unsaturated acid, and losses of starting material to the unwanted as compared to the desired product, but it furthermore does this by an advantageously straightforward and direct manipulative procedure. Thus it makes possible the economic utilization of compounds hitherto impractical to use as chemical intermediates, and makes feasible the manufacture of valuable products hitherto only difficultly available or indeed, previously unknown.

The products which may be prepared in accordance with this invention include esters of acids such as angelic and tiglic acids (2-methylcrotonic acid), 2-ethylidenehexanoic acid, 2-ethylideneheptanoic acid, 2-ethylidenedecanoic acid, 2-ethylidenedodecanoic acid, 2-ethylidenetridecanoic acid, 2-ethyl-2-hexenoic acid, 2-propyl-2-hexenoic acid, 2-ethyl-2-heptenoic acid, 2-propyl-2-isoheptenoic acid and the like, such as, for example, the methyl, ethyl, isopropyl, tert-butyl, n-amyl, hexyl and decyl esters of the stated acids. Where the free acids or salts are required instead of the esters, these are readily prepared by usual procedures such as hydrolysis with alkaline or acid reagents.

It will be appreciated that the products of the presently provided method will be mixtures of the cis and trans isomers. In referring to the present products as pure, it is to be understood that what is meant is essentially the α,β-unsaturated material, substantially free of the β,γ-unsaturated product. The formulas herein are intended to represent indifferently the cis and trans forms, and are not intended to represent specific steric configurations. Where desired, the cis and trans forms of the presently provided products can be separated by usual procedures known to those skilled in the art.

The starting materials for the practice of the present invention, as stated above, are esters of the formula

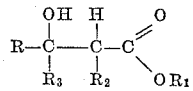

where R is selected from the class consisting of hydrogen and alkyl radicals and $R_1$, $R_2$ and $R_3$ are each alkyl radicals. The alkyl radicals will be saturated aliphatic hydrocarbon radicals, straight chain or branched, and these may include from 1 up to 12 carbon atoms. The esters in which the alkyl radicals contain from 1 to 6 carbon atoms are of sufficiently low molecular weight for convenient distillation and other manipulation, and are especially preferred. The α-alkyl β-hydroxy esters useful in the present connection may be readily prepared by alkylation of a β-keto alkanoate ester with an alkyl halide, in the presence of alkali metal: for example, by the reaction of an acetoacetate ester with an alkyl halide in the presence of sodium. This produces the acyl alkanoate, which is reduced catalytically to the hydroxy alkanoate. Illustrative of presently useful esters are, for example, ethyl 2 - methyl - 3 - hydroxybutyrate, ethyl 2,3 - dimethyl - 3-hydroxybutyrate, isopropyl 2-methyl-3-hydroxypentanoate, methyl 2-(1-hydroxyethyl)butyrate, ethyl 2-(1-hydroxyethyl)isovalerate, t - butyl 2 - (1 - hydroxyethyl)-hexanoate, ethyl 2-(1-hydroxyethyl)hexanoate, ethyl 2-(1-hydroxyethyl)heptanoate, ethyl 2-(1-hydroxyethyl)dodecanoate, amyl 3-hydroxy-2-methylbutyrate, dodecyl 3-hydroxy-2-methylbutyrate, decyl 2-(1-hydroxyethyl)hexanoate, ethyl 3-hydroxy-2-methylnonanoate, isopropyl 3-hydroxy - 2,3 - dimethyloctanoate, n - butyl 2 - (1 - hydroxypropyl)hexanoate, methyl 3-hydroxy-2-methylisovalerate, ethyl 2-(1-hydroxypropyl) heptanoate and the like.

The procedure for converting the stated esters of α-alkyl-β-hydroxyalkanoic acids into the desired α,β-unsaturated acid esters comprises as a first step their treatment with phosphorus oxychloride in a reaction medium comprising a tertiary amine. The useful amines are weakly basic amines such as tertiary amines in which each substituent of the amine N atom is a hydrocarbon radical of up to 9 carbon atoms, said amine having a pK at least about 3.25, like pyridine, 2-methyl-5-ethylpyridine, N,N-dimethylaniline, N,N-diethylaniline, N,N-dipropylaniline, triethylamine, tributylamine, quinoline and so forth.

In conducting the first step of the present method, wherein the hydroxyacid ester is treated with phosphorus oxychloride in the presence of the amine, the reaction mixture may consist essentially of the phosphorus compound, the amine and the ester. In general, more than an equivalent of the phosphorus oxychloride per mole of the hydroxyacid ester will advantageously be employed in the reaction. Indeed, it is found advantageous to add the ester gradually to the mixture of the phosphorus oxychloride and amine, so that the phosphorus oxychloride is present in great excess during the reaction, amounting to a 20-fold or greater molar excess. The ratios of the ester and oxychloride are not critical. The amount of amine employed in the reaction may also vary widely. Generally it is desirable to employ at least about one mole of amine per mole of hydroxyacid ester to be introduced into the reaction mixture. Frequently the amine can also be employed in quantities enabling it to serve as a reaction medium, and in this case considerably larger amounts may be used. Other solvents and diluents may also be present in the reaction mixture if desired. Suitable solvents and diluents are inert liquids such as aromatic hydrocarbons like benzene, toluene and xylene, aliphatic hydrocarbons such as pentane and hexane, inert ethers such as tetrahydrofuran, dioxane, diethyl ether, dibutyl ether, the dimethyl ether of diethylene glycol, the diethyl ether of diethylene glycol, phenetole and the like, esters such as ethyl acetate, and so forth.

The hydroxy acid ester and the phosphorus oxychloride will be contacted in the presence of the amine at temperatures and for contact times sufficient to effect reaction of all of the hydroxy ester with the phosphorus compound. The temperatures employed in this connection may vary from below room temperature up to any temperature below that producing decomposition of the reaction mixture components. Usually, particularly where the only solvent is the weakly basic amine, reaction is relatively vigorous and gradual addition of the hydroxy acid ester and possibly cooling to maintain the reaction mixture at temperatures below reflux may be desirable. At the end of the addition, further reaction may be desirably produced by heating the reaction mixture at temperatures below the decomposition temperature of the reaction mixture components. Atmospheric pressures are usually suitable, but if desired the reaction may be conducted at sub-atmospheric pressures, down to say about 50 mm. Hg, or at elevated pressures, up to say about 5000 pounds per square inch.

The above-described procedure provides a reaction product comprising ester product, that is, the product of reaction of the hydroxyalkyl ester with the phosphorus oxychloride, associated with other organic and inorganic components of the reaction mixture. The latter organic components may include unreacted amine, amine salt formed by reaction, and organic solvent or diluent. The ester product of the first step of the present method is now separated from such other components of the reaction mixture, prior to treatment in accordance with the second step of the method. When the amine is used as the reaction medium, salt formed by the amine will generally be present as an insoluble phase which can conveniently be removed by filtration. The remainder of the amine and solvent or diluent components of the reaction mixture can be separated by usual means such as distillation. Inorganic components of the reaction mixture can be separated from the organic product by procedures such as extraction of the organics with an organic solvent followed by removal of the extracting solvent, for example by distillation or evaporation.

The ester product of the stated first step is now treated with an inorganic base more strongly basic than the amines employed in the previous step, such as alkali and alkaline earth oxides and hydroxides like sodium hydroxide, potassium hydroxide, lithium hydroxide, magnesium hydroxide, lime and so forth. The alkali metal hydroxides are preferred, and potassium hydroxide is especially preferred. The solvent to be employed in this step should be one which has an appreciable solvent power for both the inorganic base employed and the ester product. Organic solvents, including lower aliphatic alcohols such as ethanol, isopropanol, n-butanol, methanol, and the like, diols such as ethylene glycol, ethers such as the dimethyl ether of ethylene glycol, the dimethyl ether of diethylene glycol, dioxane, tetrahydrofuran, and the like, and also an aqueous medium are suitable. The lower alkanols are particularly preferred.

The temperature, duration of contact and ratio of the base to the ester product should be sufficient to result in a reaction product in which all the ester present is unsaturated. Moderate reaction conditions generally are effective and preferred. For example, the solution of base may be added to the ester product gradually, to control the exotherm. After the addition is complete, gentle heating, to a temperature below about 100° C. and preferably not above 50° C. may be applied to complete the reaction. Up to about one mole of base may be introduced per mole of esters in the ester product treated. When the ester content of the reaction mixture consists substantially entirely of unsaturated ester, the resulting unsaturated ester material is isolated from the reaction product. Distillation can be used advantageously for such isolation. The isolated unsaturated ester will be found to be the α,β-unsaturated ester in substantially completely pure form.

The invention is illustrated but not limited by the following example.

*Example*

To prepare ethyl 2-(1-hydroxyethyl)heptanoate, a solution of ethyl 2-acetylheptanoate in ethanol is placed with nickel-on-kieselguhr catalyst in an autoclave which is pressured with hydrogen to 1450 p.s.i.g. and heated at 125° C. for 2 hours. Distillation gives a 94% yield of ethyl 2-

(1-hydroxyethyl)heptanoate, B. 74–75° C./0.2 mm., $n_D^{20}$ 1.4346.

No unsaturated ester is recovered when this product is treated with the mild dehydrating reagents, dry HCl, iodine in refluxing benzene, and fused $KHSO_4$.

When the hydroxyethylheptanoate ester is dehydrated with phosphorus pentoxide, a 1° fraction separated from the product by double distillation is shown by vapor phase chromatography (VPC) to consist of 61 area-percent of the desired α,β-unsaturated ester, ethyl 2-ethylideneheptanoate. The remaining 39 area-percent of this close fraction is the undesirable β,γ-unsaturated ester, ethyl 2-vinylheptanoate.

With phosphorus oxychloride alone, the product is again a mixture which cannot be separated by distillation. Thus, 61.3 grams (g.) (0.4 mole) of phosphorus oxychloride is refluxed with 50.6 g. (0.25 mole) of ethyl 2-(1-hydroxyethyl)heptanoate in 50 milliliters (ml.) of benzene for 22 hours. Solvent and unreacted phosphorus oxychloride are removed, and a double distillation is conducted to separate 27 g. of colorless liquid product, B. 35–36° C./0.2 mm. VPC examination shows that while 76 area-percent of this material is a mixture of the cis and trans isomers of the α,β-unsaturated ester, the remaining 24 area-percent is the undesired β,γ-unsaturated ester, ethyl 2-vinylheptanoate.

Following the method of the present invention, 136.5 g. (0.675 mole) of ethyl 2-(1-hydroxyethyl)heptanoate is added, dropwise, to 122.6 g. (0.8 mole) of phosphorus oxychloride in 400 ml. of dry pyridine. The exotherm of the reaction takes the temperature from an initial 30° C. to 84° C. during the course of the addition. After the addition is complete, the reaction mixture is heated to 120° C. and maintained at this temperature for 1.5 hours. It is then cooled to 10° C., and the reaction mixture is filtered.

The filtrate is heated to distill off most of the excess pyridine, at atmospheric pressure, and the distillation residue is then extracted with a mixture of ⅔ diethyl ether, ⅓ water. The ether layer is separated, and the remaining aqueous layer is extracted with additional ether. The ether solutions are combined, washed with water, and dried. The ether is removed, and the residue distilled to provide 107.3 g. of a clear colorless liquid boiling over the range from 44° to 54° C. at 0.23 mm. This liquid ester product is a mixture of esters of $C_9$ acids, of which 65.1 area-percent is ethyl 2-ethylideneheptanoate, and the remainder, other esters capable of conversion to the desired α,β-unsaturated ester in the following step.

A solution of 10 g. (0.179 mole) of potassium hydroxide in anhydrous ethanol is now added dropwise to this ester mixture. A slight exotherm is observed during the addition. After the addition is complete, the reaction mixture is heated at 50° C. for ½ hour, cooled, filtered, and the solvent evaporated off. Distillation of the residue gives 89.3 g. of colorless liquid, B. 36–47° C./0.23 mm., $n_D^{20}$ 1.4422. The product analyzes correctly for the unsaturated ester:

Calculated for $C_{11}H_{20}O_2$: C, 71.7%; H, 10.9%. Found: C, 71.8%; H, 10.9%.

Vapor phase chromatography indicates that the product is ethyl 2-ethylidene heptanoate in 98.1 area-percent purity. The yield, based on the ethyl 2-(1-hydroxyethyl)-heptanoate employed in the first step, is 76%.

Following the procedure of the invention but employing triethylamine as the base in the first step and sodium hydroxide as the base in the second, isopropyl 2-(1-hydroxyethyl)octanoate is converted to isopropyl 2-ethylideneoctanoate substantially free of the 2-vinyl-octanoate ester; and using pyridine and potassium hydroxide, methyl 2-hydroxy-2-ethylhexanoate is converted to the methyl ester of 2-ethyl-2-hexenoic acid, essentially free of methyl 2-ethyl-3-hexenoate.

While the invention has been described herein with particular reference to various preferred embodiments thereof, it is to be appreciated that it includes other variations and modifications and is limited only as defined in the appended claims.

What is claimed is:
1. The method of converting an α-alkyl-β-hydroxyalkanoic acid ester of the formula

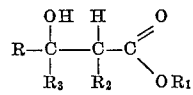

where R is selected from hydrogen and alkyl radicals and $R_1$, $R_2$ and $R_3$ are each alkyl radicals, said alkyl radicals containing from 1 to 12 carbon atoms, to a substantially pure α,β-unsaturated ester, which comprises mixing an α-alkyl-β-hydroxy ester of said formula with an excess of a molar equivalent of phosphorus oxychloride in a reaction medium comprising at least a molar equivalent of a weakly basic tertiary amine in which each substituent of the amine N atom is a hydrocarbon radical of up to 9 carbon atoms, said amine having a pK at least about 3.25, and heating the resulting reaction mixture to a temperature up to about reflux temperature until reaction of said ester with the phosphorus oxychloride is complete, separating the resulting ester product, and contacting said ester product with up to about one mole of an inorganic base more strongly basic than said amine, in an inert organic reaction medium, at a temperature below about 100° C., until the ester content of the reaction mixture consists substantially entirely of unsaturated ester.

2. The method of claim 1 in which R is H and each of $R_1$, $R_2$ and $R_3$ is a lower alkyl radical, containing up to 6 carbon atoms.

3. The method of claim 1 in which said amine is pyridine.

4. The method of claim 1 in which the said base is an alkali metal hydroxide.

5. The method of providing ethyl 2-ethylideneheptanoate substantially free of ethyl 2-vinylheptanoate which comprises mixing ethyl 2-(1-hydroxyethyl)heptanoate with an excess of a molar equivalent of phosphorus oxychloride in at least a molar equivalent of pyridine, and refluxing the reaction mixture until reaction of the said ester with the phosphorus oxychloride is compelte, separating the resulting ester reaction product, and contacting said ester product with up to about one molar equivalent of ethanolic potassium hydroxide, at a temperature below about 100° C., until the ester content of the reaction mixture consists substantially entirely of unsaturated ester, from which ethyl 2-ethylideneheptanoate can be separated by distillation substantially free of ethyl 2-vinylheptanoate.

References Cited by the Examiner

UNITED STATES PATENTS

| | | | |
|---|---|---|---|
| 2,330,180 | 9/43 | Schwarcmann | 260—405.5 |
| 2,376,704 | 5/45 | Kung | 260—486 |
| 2,531,512 | 11/50 | Hoaglin | 260—486 |
| 3,022,336 | 2/62 | Sennewald | 260—486 |

LORRAINE A. WEINBERGER, *Acting Primary Examiner.*

LEON ZITVER, *Examiner.*